UNITED STATES PATENT OFFICE.

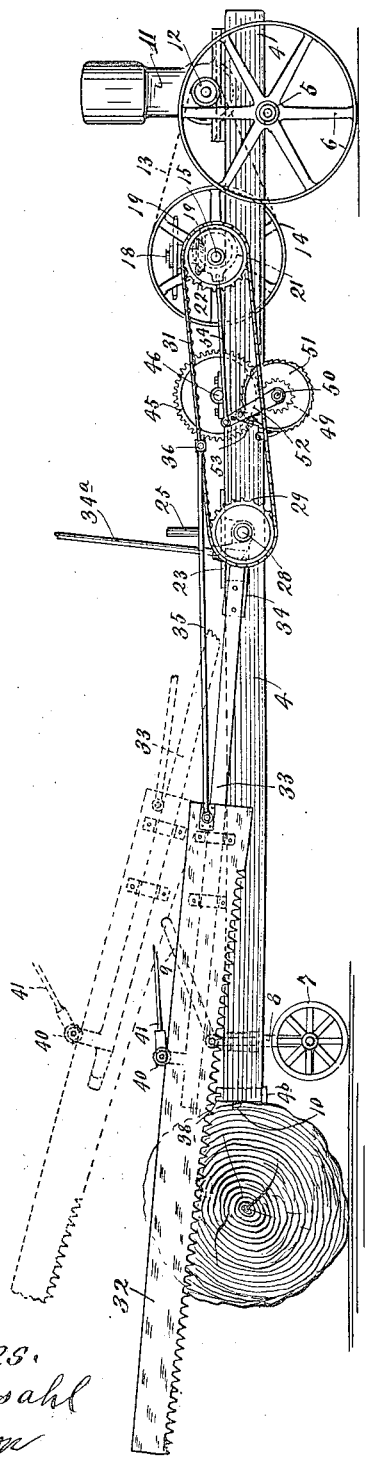

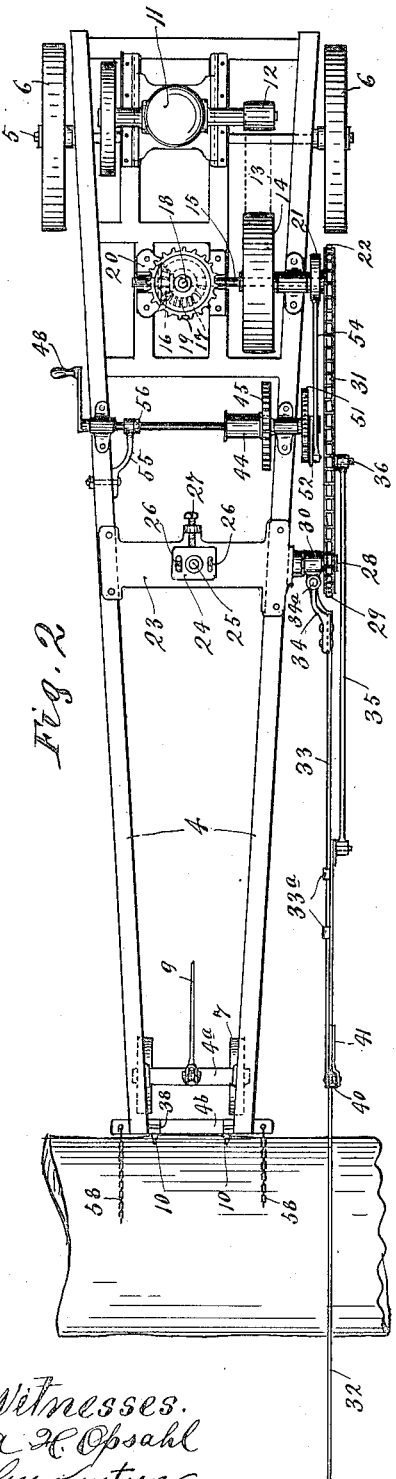

JOHN H. DIERS, OF BLAKELEY, AND OSCAR ARNESON, OF ST. PAUL, MINNESOTA, ASSIGNORS TO LIBERTY POWER SAW COMPANY, OF COUNTY OF RAMSEY, MINNESOTA, A CORPORATION OF MINNESOTA.

PORTABLE POWER SAW.

1,419,028.  Specification of Letters Patent.  Patented June 6, 1922.

Application filed February 15, 1919. Serial No. 277,237.

*To all whom it may concern:*

Be it known that we, JOHN H. DIERS, citizen of the United States, residing at Blakeley, county of Scott, State of Minnesota, and OSCAR ARNESON, citizen of the United States, residing at St. Paul, in the county of Ramsey and State of Minnesota, have invented certain new and useful Improvements in Portable Power Saws; and we do hereby declare the following to be a full, clear, and exact description of the invention, such as will enable others skilled in the art to which it appertains to make and use the same.

Our invention has for its object to provide an efficient portable, self-contained saw-mill, adapted for use, first to saw down standing trees and then to saw up the tree trunks into logs of the desired length.

The mill involves a suitable frame work, preferably mounted on front and rear trucks, one of which trucks is pivoted for steering movements so that the mill or machine, can be guided in moving to and from place to place.

The motive power is preferably an internal combustion engine mounted on the machine frame.

For cutting down the standing trees in one instance and for sawing the logs in the other instance, we provide a cross-cut saw and a novel arrangement of guiding and operating mechanism, that is shiftable or adjustable, to adapt itself to the two kinds of sawing actions. The invention also involves other important features, as will appear in the description.

The invention is illustrated in the accompanying drawings, wherein like characters indicate like parts throughout the several views.

Referring to the drawings:

Fig. 1 is a side elevation showing the saw-mill in use to saw up logs.

Fig. 2 is a plan view of the mill adjusted as shown in Fig. 1.

Fig. 3 is a view corresponding to Fig. 2 and showing the saw adjusted for sawing down standing trees.

The frame-work in the machine is a long, trussed, horizontally disposed structure, and is in its entirety, indicated by the numeral 4. The sides of this frame, preferably flare towards one end of the frame, and at the wide end of said frame is an axle 5 on which wheels 6 are loosely journaled. At the narrow end of the frame is a small two-wheeled truck 7, provided with an upright centrally located spindle 8 journaled in a cross-bar $4^a$ of the frame 4 and provided at its upper end with a draw-bar or handle 9. This truck 7 is thus pivoted for steering movements, and its handle is adapted to be turned outward for drawing the machine from place to place, or is adapted to be turned inward as shown in the drawings, when the narrow end of the frame is abutting a tree trunk or log. At its narrow end, the frame 4 has a cross-bar $4^b$ equipped with barbs 10 that are adapted to be forced into the tree trunk or log, to assist in holding the frame against lateral vibratory movements, during the sawing action.

The internal combustion engine which affords the power to the mill, is mounted on the wide end of the frame 4 and is indicated as an entirety by the numeral 11. The projecting end of the crank-shaft of this engine is provided with a driving-pulley 12. The driving-belt 13 indicated by dotted lines, runs over the driving-pulley 12 and over a larger pulley 14, that is secured on a transverse counter-shaft 15, journaled in suitable bearings on the frame 4 and provided near its inner end with a bevelled pinion 16. The pinion 16 meshes with a bevelled gear 17 which is secured to the short shaft 18, provided at its upper end with a sprocket 19. The shaft 18 is journalled in a suitable bearing that is formed as part of a bearing bracket 20 that is secured to the frame 4 and also affords bearings for the shaft 15. The shaft 15 at its outer end is provided with an eccentric 21 and with a sprocket 22. The sprocket 22 corresponds in size to the sprocket 18 that is located in a vertical plane for rotation on a horizontal axis, while the sprocket 18 is located in a horizontal plane and is mounted to rotate on a vertical axis, this arrangement being important, as will presently appear.

At the central portion of the frame 4 is a transverse tie, preferably in the form of a casting 23. Secured on the central portion of the casting 23 is a base-plate 24 provided with a vertically projecting stud 25. The base-plate 24 is preferably adjustably secured to the casting 23 by means of slot and bolt connections 26 and adjusting-screw 27, best shown in Fig. 2. Secured to one end of the casting 23 and projecting horizontally outward therefrom, is a stud 28. The stud 25 is parallel to the shaft 18, while the stud 28 is parallel to the shaft 15, and the distance between stud 25 and shaft 18 is the same as the distance between stud 28 and shaft 15. A sprocket 29 is adapted to be loosely journalled on the end of either stud 25 or stud 28, and the sleeve 30 is adapted to be pivotally mounted on the stud 25 or stud 28 at will. The Figs. 1 and 2 show sprocket 29 and sleeve 30 applied to the stud 28, as required for sawing logs or tree trunks that are in a horizontal position; and in this arrangement, an endless sprocket-chain 31 is run over the sprockets 22 and 29. Fig. 3 shows the sprocket 29 and sleeve 30 applied to the stud 25 as required for sawing standing trees; and in this arrangement the sprocket-chain 31 is run over the sprockets 19 and 29.

For supporting the cross-cut saw 32 we provide a saw-guiding bar 33, that is provided at its anchored end with a head 34 that is pivotally connected to the sleeve 30 at 34ª. As shown, the saw 32 is provided with guide-brackets that are secured thereto and embrace the guide-bar 33 to hold said saw for sliding movements, longitudinally of said bar. The bar is given long reciprocating movements through the crank-rod 35, pivotally connected to one end of the saw and to a wrist-pin 36 that is secured to one of the links of the sprocket-chain 31.

A curved metal guide-bar 37 is detachably secured to the narrow front end of the frame 4, being preferably seated in bifurcated brackets 38, secured on the front beam 4ᵇ. This bar 37 limits the downward movement of the saw-blade when the saw is set for horizontal sawing action. At one projecting end the bar 37 is provided with a guide-sheave 39. Journaled on the free end of the saw-guiding bar 33 is a small groove-wheel 40 that bears against the back edge of the saw. The numeral 41 indicates a hand-lever pivotally attached to the bar 33. Cable 42 is attached to the free end of the bar 33, is passed over guide-sheave 39, over a guide-sheave 43 on casting 23 and is attached to a small windlass-drum 44. The coil-spring 42ª is interposed in cable 42 for the purpose which hereinafter will appear. The windlass-drum 44 is secured to a spur-gear 45 and both thereof are secured to a transverse spindle 46 that is mounted for both rotary and limited endwise movements in bearings 47 on the frame 4. At its outer end, spindle 46 is provided with an operating crank 48.

The spur-gear 45 normally is in mesh with an underlying smaller spur-gear 49 that is secured to a lower transverse counter-shaft 50, and said shaft 50 at its projecting end is provided with a ratchet-wheel 51. The numeral 52 indicates a driving-lever pivoted on shaft 50 and provided with a driving-dog or pawl 53 that operates on the teeth of ratchet-wheel 51. The free end of this driving-lever 52 is adjustably pivoted to one end of a pitman 54 which at its other end is provided with an eccentric-strap which works on eccentric 21 of driving-shaft 15.

A small lock-lever 55 is pivoted to one side of the frame 4 and its free end normally engages a collar 56 on spindle 46. In the normal position of the spindle 46, gear 45 and crank 48, lock lever 55 by engagement with collar 56, holds gear 45 in the plane of and in mesh with underlying gear 49; but when said lever 55 is raised and the said parts 45, 46 and 48 are moved to positions indicated by dotted lines in Fig. 3, then gear 45 will be slid axially out of mesh with gear 49, thereby disconnecting the windlass-drum 44 from pawl and ratchet driving mechanism.

Obviously, with a saw set for action in either of the two positions above described, it will be given its long reciprocating movements from the endless sprocket-chain 31. When the saw is set to cut in a vertical plane for cutting logs as shown in Figs. 1 and 2, the saw will be fed or kept to its work by the action of gravity. When, however, the saw is set to cut in a horizontal plane for cutting down standing trees or for cutting off tree stumps that project above the ground, then an automatic saw feeding device is required to keep the saw to its work and to feed the same through the tree trunk, as the trunk is being sawed. This automatic feed mechanism is provided by the pawl and ratchet mechanism and cable connections described. With these automatic feeding devices, the pawl equipped lever 52 will be reciprocated by eccentric 21 with an action timed in proportion to the reciprocating movements given to the saw, and of course the movements thereby imparted to ratchet-wheel 51 and through gears 49 and 45, to windlass-drum 44, will wind up cable 42 and feed the saw to its work with an action proportioned to the speed of the sawing movement. This rate of feed in proportion to the number of saw movements, may be varied by varying the radial adjustment of the pivotal connection between lever 52 and pitman 54. Spring 42ª yieldingly holds the saw to its work and makes the feed movement continuous, even under intermittent movements of the cable winding drum.

When the trunk of a standing tree has been so nearly sawed through that the tree starts to fall or is about to fall, then it is desirable to quickly remove the saw from working position, so that it may not be damaged by the fallen tree. To do this, it is only necessary first to raise the lock-lever 55, then taking hold of crank 48, to move the same together with shaft 46, drum 44 and gear 45 axially of said shaft, to the dotted line positions in Fig. 3. This, as already stated, will disconnect the windlass-drum from the pawl and ratchet driving connection, and it will enable the operator, simply by taking hold of handle 41, to quickly throw the saw 32 backward out of working position and out of danger from damage by the falling tree. Under the above action, it will of course be understood that cable 42 will be freely paid out to permit the free saw retracting movement described.

The frame of the machine at its tree trunk or log engaging end, will be provided with any of the well-known means for anchoring same to said tree trunk or log. For example, it may be provided with pivoted grapple-arms 57 having tree trunk or log engaging barbs at their free ends. Or said frame may have anchoring chains 58, as shown in Fig. 2.

What we claim is:—

1. In a portable saw mill, a framework, a motor on said framework, vertically and horizontally projected saw supporting and motor driven saw driving devices, the former operative to support and operate a saw to cut in a horizontal plane and the latter operative to support and operate a saw in a vertical plane, a saw shiftable bodily from the one supporting device to the other and arranged to be operated from the one or the other of said driving devices, according to the position in which it is set, and a chain also bodily shiftable from a horizontal to a vertical plane to drive said saw in either position.

2. A portable saw mill comprising a frame, a power-shaft on said frame, two supports on said frame, a saw guide transferable from one of said supports upon which it can swing in one plane onto the other of said supports on which it can swing in a different plane, a saw mounted to reciprocate on said saw guide and transferable therewith from one support to another, driving connections between said power shaft and saw involving elements that are shiftable with the saw support from one position to the other, and a saw feeding device operative on the saw to hold the same to its work.

3. The combination with a saw arranged for movement in a horizontal plane, a feeding device comprising a saw engaging member, a flexible member attached thereto, a spring interposed in said flexible member, and means for pulling on said flexible member whereby the saw engaging member is yieldingly urged against the saw to feed the same.

4. The combination with a saw arranged for movement in a horizontal plane, a feeding device comprising a saw-engaging member, a cable attached thereto, a spring interposed in said cable, a windlass drum to which said cable is attached, and means for winding said cable on said drum including a pawl and ratchet mechanism.

5. The combination with a saw arranged for movement in a horizontal plane, a feeding device comprising a saw-engaging member, a cable attached thereto, a spring interposed in said cable, a windlass drum to which said cable is attached, a shaft supporting said drum, means for turning said drum, mounted on said shaft, said shaft and means being movable longitudinally out of position for driving said drum, means for locking said shaft in position to drive said drum, and means for turning said shaft and drum when the shaft is moved longitudinally out of position for driving said drum.

6. In a portable saw mill, the combination of a framework, two motor driven sprockets, one working in a vertical and the other in a horizontal plane, two sprocket supporting studs on said frame, one projecting vertically and the other horizontally thereof, the studs being equidistant, each from one of said motor driven sprockets, a sprocket shiftable from the one stud to the other, a sprocket chain arranged to run over the shiftable driven sprocket and one of said motor driven sprockets, a saw guide having a head adapted to be pivotally mounted on either of said two studs at will, a cross-cut saw mounted to reciprocate on said saw guide, and a connecting rod connecting said saw to one of the links of said sprocket chain.

7. A power drag saw comprising a frame, means at one end of the frame for engaging timber to be sawed, a power unit at the other end of the frame, gearing, including a shaft, connected to the power unit, a saw mounted on the frame to operate at the end thereof remote from the power unit, driving means for the saw adaptable to the shaft for actuation thereby and removable therefrom, and other gearing connected to the shaft for receiving the saw driving means to actuate the latter, said saw driving means and the saw being changeable from the shaft to the gearing actuated thereby, or vice versa, for cutting the timber in either of different planes.

8. A power drag saw provided with a frame, a power unit mounted on the frame, a reciprocable saw pivotally mounted on the frame and movable cross wise of the frame about its pivot, connections between the power unit and the saw to reciprocate the latter, and yieldable feeding means for the saw connected to and actuated at each reciprocatory movement of the saw to cause the saw to advance into the material being cut by the saw.

9. A power drag saw provided with a frame, a power unit mounted on the frame, a reciprocable saw pivotally mounted on the frame and movable cross wise of the frame about its pivot, connections between the power unit and the saw to reciprocate the latter, feeding means for the saw connected thereto to cause the saw to advance into the material being cut, said feeding means giving the saw a normal tendency to advance into the work, and means for maintaining said tendency operating in time with the reciprocatory movements of the saw.

10. A power drag saw provided with a pivotally mounted reciprocable saw, means for feeding the saw to the material to be cut by the saw, comprising elastic tensioned means normally urging the saw to the work, and means operating in time with the reciprocatory movements of the saw for maintaining the tension of the elastic means as the saw advances into the material being cut.

11. In a power drag saw, a reciprocatory saw, means for feeding the saw to the work, comprising a saw guide, an elastic strand connected at one end to the saw guide, winding means for the other end of the elastic strand, and actuating means for the winding means operating in time with the reciprocatory movements of the saw.

In testimony whereof we affix our signatures in presence of two witnesses.

JOHN H. DIERS.
OSCAR ARNESON.

Witnesses:
M. E. MULLANEY,
R. P. CHASE.